(12) United States Patent
Peterson (10) Patent No.: US 7,764,724 B2
(45) Date of Patent: Jul. 27, 2010

(54) LASER COMBINER

(75) Inventor: Mark David Peterson, Lake Oswego, OR (US)

(73) Assignee: Seiko Epson Corporation, Shinjuku-ku, Tokyo (JP)

( * ) Notice: Subject to any disclaimer, the term of this patent is extended or adjusted under 35 U.S.C. 154(b) by 0 days.

(21) Appl. No.: 11/939,473

(22) Filed: Nov. 13, 2007

(65) Prior Publication Data

US 2008/0080176 A1    Apr. 3, 2008

Related U.S. Application Data

(62) Division of application No. 11/399,265, filed on Apr. 5, 2006, now abandoned.

(60) Provisional application No. 60/702,726, filed on Jul. 26, 2005.

(51) Int. Cl.
*H01S 3/08* (2006.01)

(52) U.S. Cl. .............. 372/108; 372/50.12; 372/99; 372/100; 372/101; 372/107; 362/230; 362/341

(58) Field of Classification Search ............... 372/90, 372/99, 100, 101, 107, 108; 362/230, 341
See application file for complete search history.

(56) References Cited

U.S. PATENT DOCUMENTS

| 4,027,976 | A | 6/1977 | Amon | |
|---|---|---|---|---|
| 5,440,352 | A | 8/1995 | Deter et al. | |
| 6,005,717 | A * | 12/1999 | Neuberger et al. | 359/619 |
| 6,240,116 | B1 | 5/2001 | Lang et al. | |
| 6,547,399 | B2 | 4/2003 | Knox | |
| 6,781,775 | B2 | 8/2004 | Bendat et al. | |
| 6,970,294 | B2 | 11/2005 | Nishimura | |
| 6,995,912 | B2 | 2/2006 | Okazaki et al. | |
| 7,103,239 | B2 | 9/2006 | Kish et al. | |
| 2004/0252743 | A1 * | 12/2004 | Anikitchev et al. | 372/97 |
| 2006/0152436 | A1 | 7/2006 | Kowarz | |
| 2006/0256821 | A1 | 11/2006 | Richards | |

* cited by examiner

*Primary Examiner*—Minsun Harvey
*Assistant Examiner*—Yuanda Zhang
(74) *Attorney, Agent, or Firm*—Townsend and Townsend and Crew, LLP (57) ABSTRACT

A laser system. The laser system includes a first laser device configured to emit a first laser beam, a second laser device configured to emit a second laser beam, and a third laser device configured to emit a third laser beam. The laser system also includes a laser combiner configured to receive the first, second, and third laser beams and output the first, second, and third laser beams with less separation downstream of the laser combiner than upstream of the laser combiner.

8 Claims, 9 Drawing Sheets

LASER COMBINER

CROSS REFERENCE TO RELATED APPLICATIONS

This application is a divisional of U.S. patent application Ser. No. 11/399,265, filed Apr. 5, 2006, which claims the benefit of U.S. Provisional Application No. 60/702,726, filed Jul. 26, 2005. The above applications are hereby incorporated herein by reference for all purposes.

BACKGROUND

A laser system generates an image and projects it to a display surface for an audience. Numerous applications require images be projected in color. Laser systems typically project color using red, green, and blue components. For example, a laser system may use colored glass panels, a color wheel, or individual color illumination sources to create a color image. In many instances, an illumination source of high intensity improves the clarity and color accuracy of a projection. Laser systems that include high intensity illumination sources that are small in size and operate at cool temperatures are desirable.

The inventor herein has recognized that, in some instances, laser devices would be a desirable source of illumination, due to their ability to be collimated into a high intensity beam. However, the inventor has recognized difficulties that arise when trying to implement laser devices as illumination sources. For example, in some instances it may be beneficial to combine multiple laser beams into the same physical area or areas adjacent to each other. A plurality of laser beams of the same color may be combined to increase the intensity of illumination; whereas, a plurality of different color laser beams may be combined to create various new colors. The size of a laser package can be large compared to the size of the projected laser beam; consequently, the physical space necessary to separate the laser packages can make it a challenge to combine and/or project laser beams into the same physical area or areas adjacent to each other.

WRITTEN DESCRIPTION

The present disclosure is directed to laser combiners that can be used to direct two or more laser beams together. For purposes of illustration, combined laser beams are illustrated side-by-side in the accompanying drawings. It should be understood that in some embodiments combined laser beams can shine through the exact same physical space and/or be immediately adjacent one another, and the side-by-side arrangement shown in the drawings is used to demonstrate that combined beams are made from two or more constituent input beams. In the following embodiments, the laser combiner may be made from a substantially homogeneous plastic or a substantially homogeneous glass.

Figure 1:
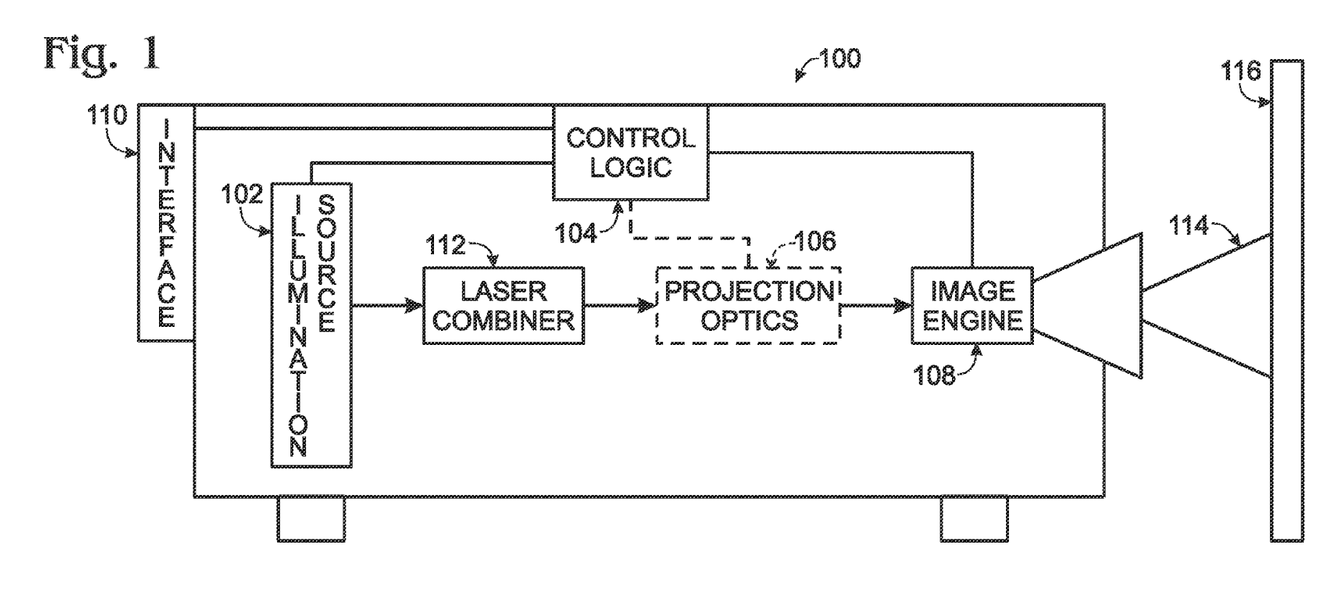
FIG. 1 schematically shows a laser system including a laser combiner.

FIG. 1 schematically shows a laser system 100 that can be used to present still and or motion video images 114 to a display surface 116. Laser system 100 can be configured for front or rear projection at virtually any resolution, including high definition resolutions, with virtually any format, including widescreen formats, while remaining within the intended scope of this disclosure.

Laser system 100 can include illumination source 102, control logic 104, projection optics 106, image engine 108, interface 110, and laser combiner 112. Interface 110 can be configured to receive input data from an input source such as a computer and/or other media source via numerous wired or wireless connections, nonlimiting examples of which include USB, USB 2.0, FIREWIRE, S-VIDEO, DVI, VGA, 802.011a/b/g, etc. Interface 110 can pass received data to control logic 104, where such data can be processed so as to produce a projected video image corresponding to the received data, as explained below.

Control logic 104 can be configured to cooperate with illumination source 102, projection optics 106, and image engine 108, during the image formation and projection process. Control logic 104 can control the output of illumination source 102. For example, control logic 104 may send operation signals to turn on/off the illumination source and/or to adjust illumination intensity. Control logic 104 can be configured to operate image engine 108 so as to modulate light from the illumination source to form a video image for projection. Control logic 104 may also make adjustments to compensate for various projection issues, such as keystoning.

Illumination source 102 can include one or more laser devices suited for providing high-intensity, coherent light. When an illumination source includes two or more different laser devices, the devices may be physically arranged in a variety of configurations relative to each other. Nonlimiting examples of such arrangements are discussed below. Laser beams from the laser devices may be directed or focused through a variety of projection optics, including, but in no way limited to, mirrors, lenses, prisms, and laser combiners.

Image engine 108 can be configured to modulate light so as to produce a desired video image for projection. Image engine 108 can include one or more Liquid Crystal Display (LCD) panels, Digital Light Processing (DLP) modules, Liquid Crystal on Silicon (LCOS) modules, or other devices for forming a projected image. Depending on the technology used to form the image, a color separator, color wheel, or other device may be used. The image engine can be configured to process different color channels (e.g., red, green, and blue) independently of one another. As shown, control logic 104 cooperates with projection optics 106 and image engine 108 to project image 114 onto display surface 116.

Although projection optics 106 are shown schematically downstream from laser combiner 112 and upstream from image engine 108, it should be recognized projection optics may be positioned throughout the system. Projection optics may include mirrors, lenses, filters, prisms, dichroic plates, or virtually any other device that at least partially focuses, redirects, absorbs, or otherwise works on light from the illumination source. For example, when an illumination source generates a laser beam, a lens may collimate the laser beam so that it can be substantially focused and directed. As another example, a projection lens can magnify an image onto a display surface. In some embodiments, mirrors can be used to direct laser beams into a laser combiner.

To improve intensity and/or to combine multiple colors it may be desired to move two or more laser beams adjacent to each other in the same physical area. Laser device packages may be physically large compared to the generated laser beam size. The size of a laser device package may make it difficult to position multiple laser device packages from being positioned such that the laser beams can be combined efficiently. The inventor herein has recognized that lasers beams generated from laser devices arranged in numerous configurations may be combined via the optical geometry of a laser combiner, as described by way of nonlimiting examples below.

The following descriptions use relative indications of position and/or direction, such as left, right, above, below, in front of, behind, etc. It should be understood that this is for convenience and clarity in describing the illustrations, and in no way limits the described laser device configurations to any particular orientation. Furthermore, the illustrated laser device configurations are provided only as examples of the many possible configurations within the scope of this disclosure.

Figure 2:
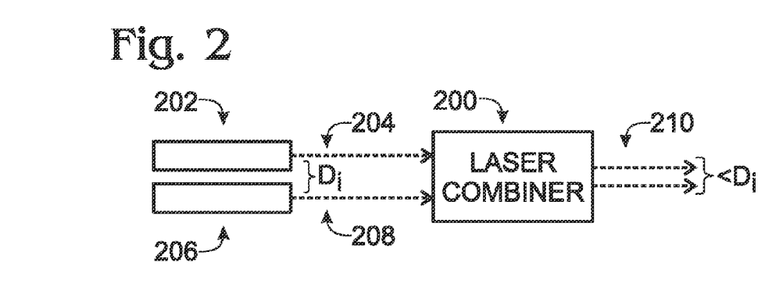
FIGS. 2-6 schematically show laser combiners combining lasers from a variety of different laser device arrangements.

FIG. 2 schematically shows a non-limiting example of a laser device configuration that can be used with laser combiners of the present disclosure. As shown, a laser beam 204 originating at laser device 202 comes from the left and enters laser combiner 200, and a laser beam 208 originating at laser device 206 also comes from the left and enters laser combiner 200. The laser beams originate an input distance Di from one another. Distance Di can be limited by the physical size of the laser device.

In some embodiments, a laser combiner can include a common input face that two or more laser beams enter. Some embodiments may have two or more input faces that a plurality of laser beams may enter. In the present embodiment, laser beam 204 and laser beam 208 enter laser combiner 200 parallel to each other. Laser combiner 200 directs the laser beams closer to each other due to the optical geometry of the combiner, so that when the laser beams exit the combiner they are beamed into generally the same physical area. The combined laser beam(s) 210 exits laser combiner 200 to the right. As illustrated, the output laser beam can be parallel to one or more of the input laser beams.

In some embodiments, two or more laser beams may enter a laser combiner from different angles (not parallel); and the resulting laser beam(s) exiting the laser combiner may have an exit path that can be parallel to at least one of the input laser beams. In some embodiments, the exiting laser beam(s) may have an angle that is not parallel to the input laser beams. Regardless of the input angles of the laser beams, the optical geometry of the laser combiner can be configured to direct the laser beams so they exit the laser combiner with a separation distance less than Di.

Figure 3:
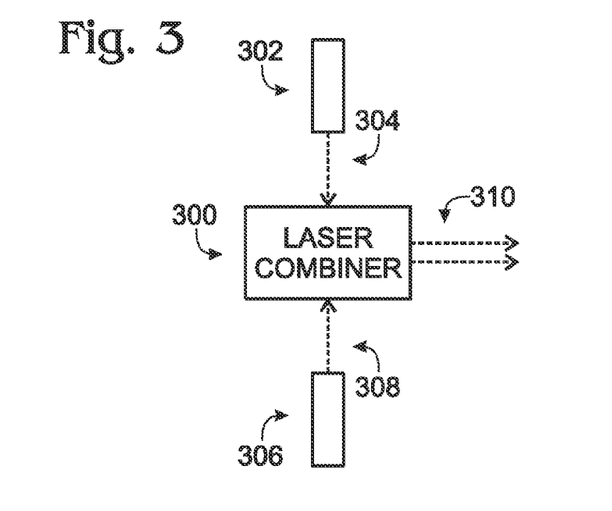

FIG. 3 schematically shows another example of a laser device configuration that can be used with laser combiners of the present disclosure. A laser beam 304 originating at laser device 302 comes from the top and enters laser combiner 300; a second laser beam 308 originates at laser device 306 comes from the bottom and enters laser combiner 300. In this embodiment, laser beam 304 and laser beam 308 enter laser combiner 300 through opposite sides. The combined laser beam(s) 310 exits laser combiner 300 to the right. Laser combiner 300 directs the laser beams closer to each other due to the optical geometry of the combiner, so that when the laser beams exit the combiner they are beamed into generally the same physical area. The combined laser beams can be beamed through the same physical space and/or be beamed parallel to one another and closer to one another than is allowed by the physical size of the laser devices without the use of the laser combiner.

Figure 4:
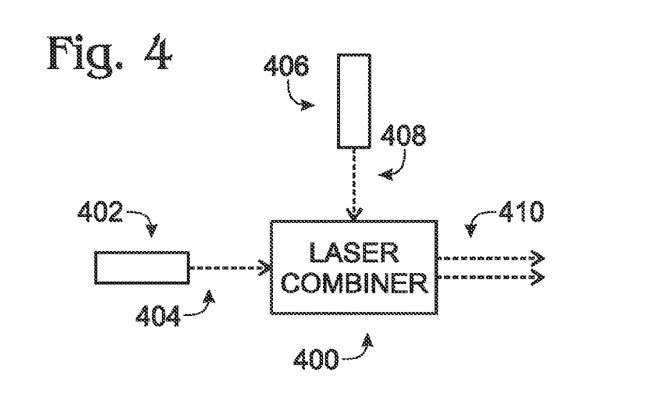

FIG. 4 schematically shows an example laser device configuration that can be used with laser combiners of the present disclosure. A laser beam 404 originating at laser device 402 comes from the left and enters laser combiner 400; a laser beam 408 originating at laser device 406 comes from above and enters laser combiner 400. Laser beam 404 and laser beam 408 enter laser combiner 400 at angles perpendicular to each other. The combined laser beam(s) 410 exits laser combiner 400 to the right. The laser combiner directs the input laser beams closer to each other due to the optical geometry of the combiner, so that when the laser beams exit the combiner they are beamed into generally the same physical area. The combined laser beams can be beamed through the same physical space and/or be beamed parallel to one another and closer to one another than is allowed by the physical size of the laser devices without the use of the laser combiner. The output laser beam(s) can be parallel and/or perpendicular to one or more of the input laser beams.

Figure 5:
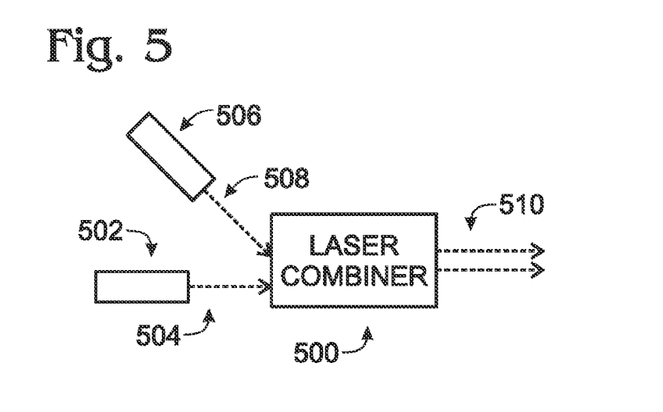

FIG. 5 schematically shows an example laser device configuration that can be used with laser combiners of the present disclosure. A laser beam 504 originating at laser device 502 comes from the left and enters laser combiner 500; a laser beam 508 originating at laser device 506 comes at an angle from above and enters laser combiner 500. The combined laser beam(s) 510 exits laser combiner 500 to the right. The laser combiner directs the input laser beams closer to each other due to the optical geometry of the combiner, so that when the laser beams exit the laser combiner they are beamed into generally the same physical area. The combined laser beams can be beamed through the same physical space and/or be beamed parallel to one another and closer to one another than is allowed by the physical size of the laser devices without the use of the laser combiner.

Figure 6:
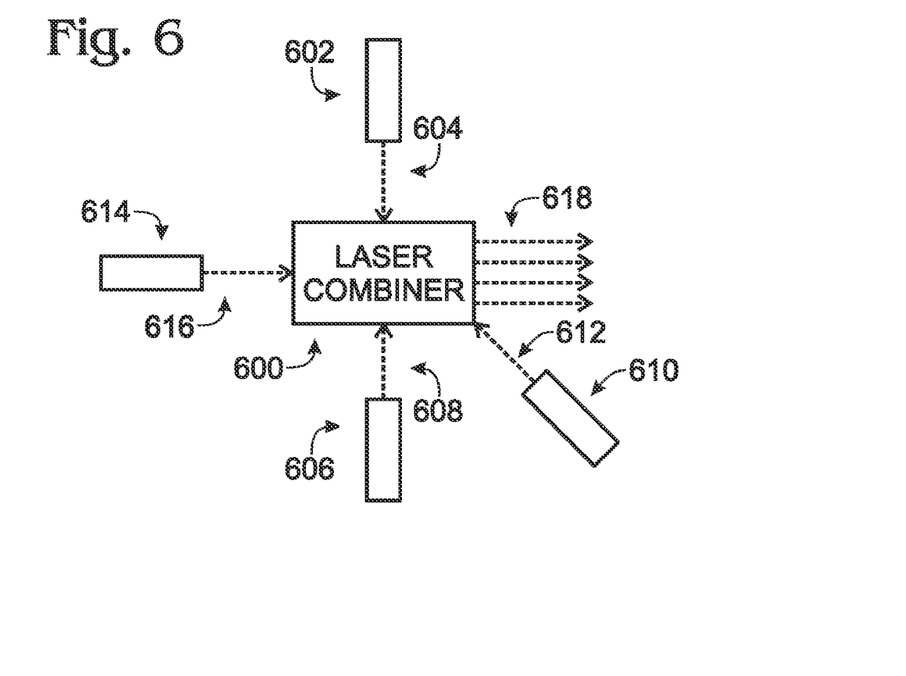

FIG. 6 schematically shows an example laser device configuration that can be used with laser combiners of the present disclosure. A laser beam 604 originating at laser device 602 comes from above and enters laser combiner 600; a laser beam 608 originating at laser device 606 comes from below and enters laser combiner 600; a laser beam 612 originating at laser device 610 comes from out of the page and enters laser combiner 600. Laser beam 604, laser beam 608, and laser beam 612 all enter laser combiner 600 in the same two-dimensional plane. A laser beam 616 originating at laser device 614 comes from the left and enters laser combiner 600. Laser beam 616 enters laser combiner 600 at an angle that can be perpendicular to the angles of laser beam 604, laser beam 608, and laser beam 612. All the inputted laser beams are combined using the optical geometry of laser combiner 600. The resulting laser beam(s) 618 exits laser combiner 600 to the right. In this embodiment, laser beam(s) 618 exits laser combiner 600 at an angle that can be parallel to laser beam 616 and perpendicular to laser beam 604, laser beam 608, and laser beam 612. The optical geometry of the laser combiner can be configured to direct the laser beams so they exit the laser combiner with a separation distance that is less than would be possible without the laser combiner.

The above-described arrangements are non-limiting examples of some of the possible laser device configurations within the scope of this disclosure. Each example may be modified and remain within the scope of the present disclosure. For example, the number of input laser beams can vary, the angles of any or all of the input laser beams can be changed, and/or the input distance Di between any two laser devices can be increased or decreased. As explained by way of example below, a laser combiner can be configured with an optical geometry that can combine two or more laser beams originating from laser devices having virtually any arrangement. For any particular laser device arrangement, there may be one or more different laser combiner configurations that can be used to effectively combine the laser beams of the respective laser devices.

The optical geometry of a laser combiner influences how laser beams directed toward the combiner will be redirected and/or otherwise modified before leaving the combiner. The optical geometry of any particular laser combiner can be designed to produce a desired output beam(s) from input beams originating from a given laser device arrangement (non limiting examples of which are provided above).

The optical geometry of a laser combiner may be configured to alter the path of an input laser beam by refraction, reflection, total internal reflection, or a combination thereof. Laser beam combiners may also be configured to have a laser beam pass through an orifice in the laser combiner or transmit straight through a surface without change in direction.

Refraction is an optical phenomenon that occurs when light passes from one type of medium to another. Refraction may deflect the path of a laser when it enters or exits a laser combiner. Total internal reflection is the reflection of light (or other electromagnetic radiation) from the interface of a medium having a larger index of refraction with a medium having a smaller index of refraction when making an angle to the normal. Accordingly, the index of refraction of one or more portions of the laser combiner can be selected to produce desired refractions, reflections, and total internal reflections. While not required, treatments or coatings can be applied to a laser combiner surface to make it a transmissive, refractive, or total internal reflective surface.

Figure 7:
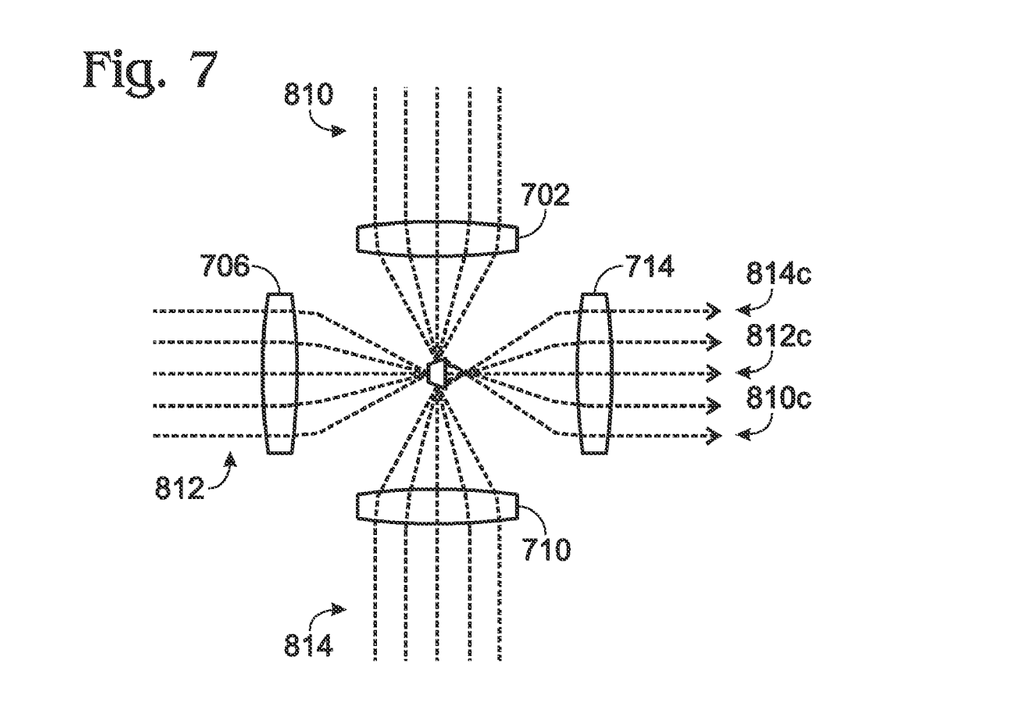
FIG. 7-16 schematically show a variety of different laser combiners in accordance with the present disclosure.
Figure 8:
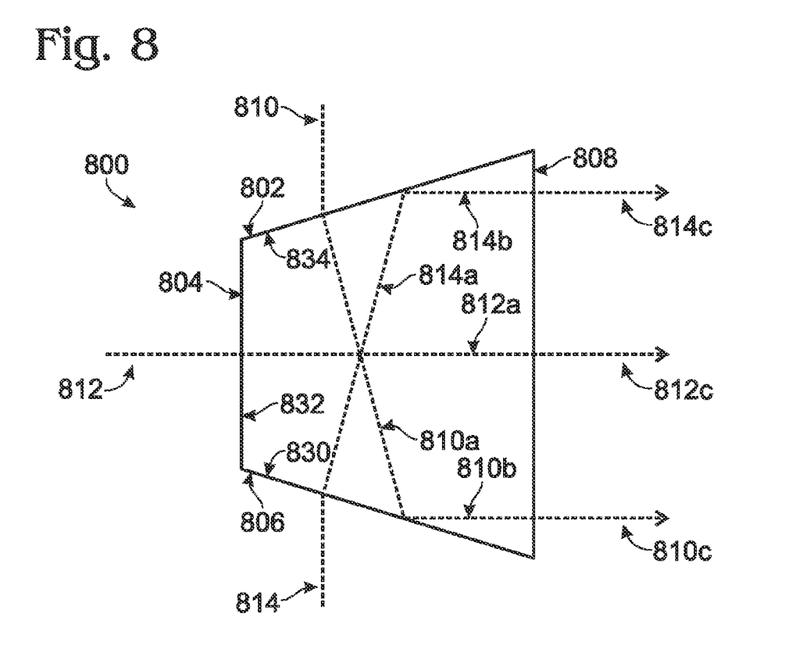

FIGS. 7 and 8 show an exemplary laser combiner 800, which is configured to combine three laser beams that are directed toward the laser combiner from three different directions. In the arrangement illustrated in FIG. 7, lens 702 focuses laser beam 810, lens 706 focuses laser beam 812, and lens 710 focuses laser beam 814. The lenses can be used to focus the beams into input faces of laser combiner 800. Output lens 714 can recollimate the resulting output laser beam(s) (814c, 812c, 810c). The output laser beam(s) of the laser combiner can be directed to the same general area but at three different angles, with generally the same area and substantially parallel angles, and/or with substantially parallel exit paths that are adjacent to each other.

As best shown by FIG. 8, the laser combiner includes an external input face 802 for receiving input laser beam 810, an external input face 804 for receiving input laser beam 812, and an external input face 806 for receiving input laser beam 814. The laser combiner also includes an output face 808 from which the combined laser beam(s) exit the laser combiner (i.e. laser beam 814c, laser beam 812c, laser beam 810c). In the illustrated embodiment, the input laser beams originate and remain in that same plane until entering the laser combiner. Furthermore, the combined laser beam(s) remain in this same plane after leaving the laser combiner.

As shown at 810a, laser beam 810 can travel from external input face 802 to internal face 830 within the laser combiner. In some embodiments, depending on the refractive index of the laser combiner, a laser beam entering the laser combiner may refract. Laser beam 810 can reflect off internal face 830, and as shown at 810b, can travel between internal face 830 and output face 808, where the laser beam exits the laser combiner. In some embodiments, the laser beam may be totally internally reflected at internal face 830. As such, the external input face at one side of the laser combiner can receive a laser beam and allow it to at least partially pass into the laser combiner, and the internal face of that same side of the laser combiner can internally reflect a different laser beam.

Laser combiner 800 redirects laser beam 814 in substantially the same way as it redirects laser beam 810. As can be seen at 814a, laser beam 814 travels between external input face 806 to internal face 834 (i.e., the backside of external input face 802), and at 814b internally reflects between internal face 834 and output face 808, where the laser beam exits the laser combiner. An internal reflective feature such as this can be used with various other types of internal reflective features, some of which are described below.

Laser combiner 800 has an optical geometry that allows laser beam 812 to pass straight through the combiner. As shown, laser beam 812 can be directed toward external input face 804 and travels through the laser combiner at 812a to output face 808, where the laser beam exits the laser combiner. A pass through feature such as this may be used in combination with various different types of internal reflective features.

In some embodiments, the laser combiner can be configured to combine more than three laser beams by incorporating additional external input faces. The laser combiner may be shaped like a pyramid with an even number of sides, wherein the output face correlates to the base of the pyramid and the input faces correlate to the sides of the pyramid. A laser combiner having a pyramid shape can be configured to combine an even number of laser beams by having an even number of faces. In order to combine an odd number of laser beams using a laser combiner with a pyramid shape, the apex of the pyramid can be truncated to provide an additional face to facilitate the odd numbered laser beam. A pyramid-like structure can also be formed with an odd number of sides, with or without a truncated apex.

The optical geometry, which includes the relative orientation and positioning of the various faces of the laser combiner as well as the refractive index of the laser combiner, can be selected so as to redirect two or more laser beams from a particular laser device configuration toward a desired target. In the illustrated embodiment, the input laser beams originate at three different laser devices that are physically spread apart. Such a spread-apart arrangement may be selected in order to accommodate laser devices that occupy a relatively large amount of space, to increase space between laser devices so as to allow better cooling, or for any number of reasons. Despite the spread-apart arrangement of the individual laser devices, the laser beams originating from those devices can be combined by laser combiner 800 so that the combined laser beam(s) exit the laser combiner in substantially the same location. In this manner, the laser beam(s) exiting the laser combiner can be less separated than the laser beams entering the laser combiner. As a nonlimiting example, a laser combiner can be configured to output a combined laser beam that can be made up of two or more laser beams originating from laser devices that are spaced at least several centimeters apart from one another, and the individual laser beams that make up the combined output laser beam can be directed through substantially the same space. In some embodiments, instead of being directed through substantially the same space, the combined laser beams may be substantially less separated than the input laser beams but still remain distinctly separated. In some embodiments, the laser beams may exit the laser combiner in substantially parallel paths, and in some embodiments, the laser beams may exit the laser combiner with desired nonparallel paths.

Etendue or geometric invariant is a property of an optical system. It is given by the cross-sectional area of a cone of light (in the plane perpendicular to the propagation direction), multiplied by the solid angle subtended by the light. Etendue cannot decrease in an optical system without the loss of light.

Laser devices typically have relatively small etendue. From an etendue standpoint, combining laser beams into a small physical area can be much more efficient than placing laser packages adjacent to each other and aiming the laser beams at various angles toward the same location. Using a laser combiner that employs total internal reflection can be an efficient way to maintain a high level of etendue while combining multiple laser beams.

Figure 9:
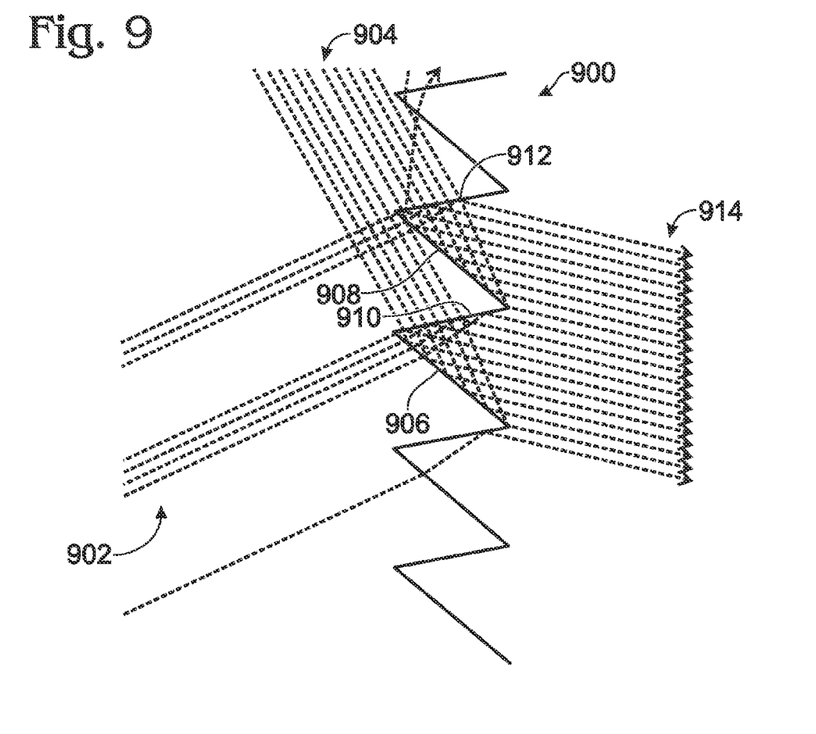

FIG. 9 schematically shows a laser combiner 900 configured to combine two or more laser beams that are directed toward the laser combiner from two or more different directions. Laser combiner 900 includes at least four reflective faces. Face 906 and face 908 receive input laser beam 904, and face 910 and face 912 receive input laser beam 902. Face 906 and face 908 are parallel to each other, and face 910 and face 912 are parallel to each other. In the illustrated embodiment, the input laser beams approach the laser combiner from different directions. As shown, laser combiner 900 can be configured so that combined laser beam(s) 914 exit with paths that are adjacent to each other and occupy the same space. The combined laser beam(s) may not include all the light that enters the laser combiner.

From an etendue standpoint, any light that enters a combiner but does not exit as part of the combined laser beam(s) reduces the efficiency of the laser combiner. A prism, such as the one found in FIG. 8, may preserve etendue.

Figure 10:
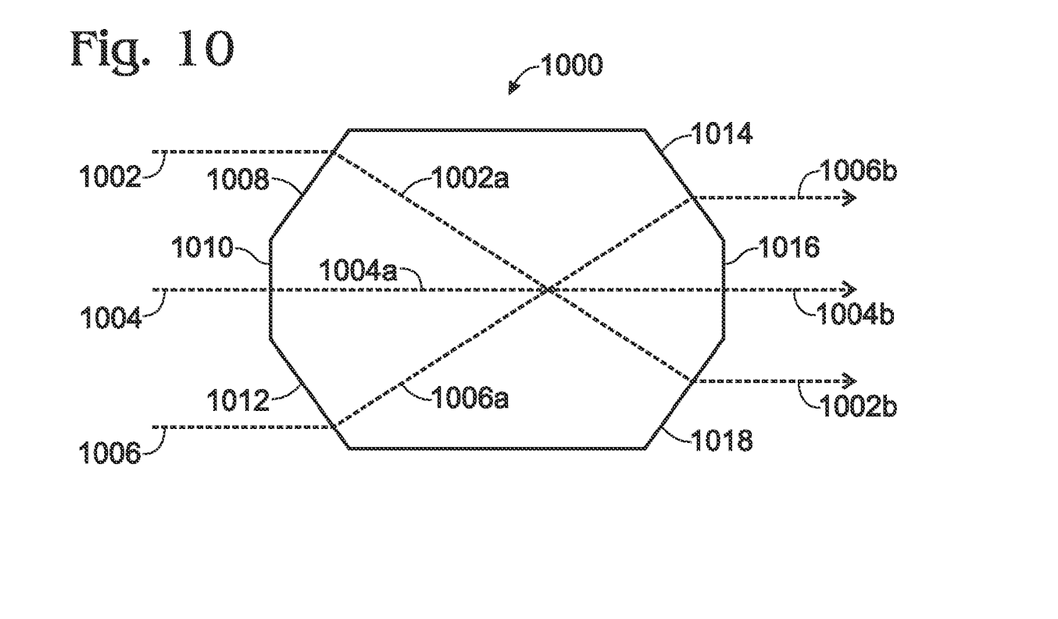

Prism laser combiners have many different configurations including, but not limited to, octagons and hexagons. FIG. 10 shows a cross section of an octagonal prism configured to combine three laser beams with parallel input paths. Laser combiner 1000 includes three external input faces. Face 1008 receives input laser beam 1002, face 1010 receives input laser beam 1004, and face 1012 receives input laser beam 1006. The laser combiner also includes three external output faces. Laser beam 1006 exits the laser combiner through face 1014, laser beam 1004 exits the laser combiner through face 1016, and laser beam 1002 exits the laser combiner through face 1018. In the illustrated embodiment, the input laser beams originate and remain substantially parallel and in the same plane until entering the laser combiner. Furthermore, the combined laser beams(s) remain substantially parallel and in this same plane after leaving the laser combiner.

In some embodiments, depending on the refractive index of the laser combiner, a laser beam entering the laser combiner may be refracted. In the present embodiment, laser beam 1002 travels through input face 1008 where it can be refracted. As shown at 1002a, laser beam 1002 can travel from external input face 1008 to face 1018 within the laser combiner. As shown at 1002b, laser beam 1002 can be refracted as it exits output face 1018.

Laser combiner 1000 redirects laser beam 1006 in substantially the same way as it redirects laser beam 1002. As shown, laser beam 1006 travels through input face 1012 where it can be refracted. As shown at 1006a, laser beam 1006 can travel from external input face 1012 to face 1014 within the laser combiner. As shown at 1006b, laser beam 1006 can be refracted as it exits output face 1014.

Laser combiner 1000 has an optical geometry that allows laser beam 1004 to pass straight through the laser combiner. As shown, laser beam 1004 can be directed toward external input face 1010 and travels through the laser combiner at 1004a. As shown at 1004b, laser beam 1004 exits output face 1016 without changing direction.

In the illustrated embodiment, the substantially parallel input laser beams originate at three different laser devices that are pointing in the same direction. Despite the laser devices being located in the same general area, the laser beams generated by the laser devices may have substantial separation distance due to the size of the laser devices relative to the beam size. Therefore, the laser beams originating from the laser devices can be combined by laser combiner 1000 so that the combined laser beam(s) exit the laser combiner with less separation than the laser beams entering the laser combiner.

In the above-described example, external input face 1008 and external input face 1012 can be enlarged to allow greater separation distance between input laser beam 1002 and input laser beam 1006 while still maintaining parallel input paths. Extending the input faces would, in turn, increase the overall size of the prism. The separation distance of the combined laser beam(s) (i.e. laser beams 1002 and 1006) after exiting the laser combiner can only be as small as the length of output face 1016. Increasing or decreasing the size of output face 1016 can increase or decrease the separation distance between the combined laser beam(s) accordingly. In some embodiments, the laser beam(s) may exit the laser combiner with desired nonparallel exit paths.

Figure 11:
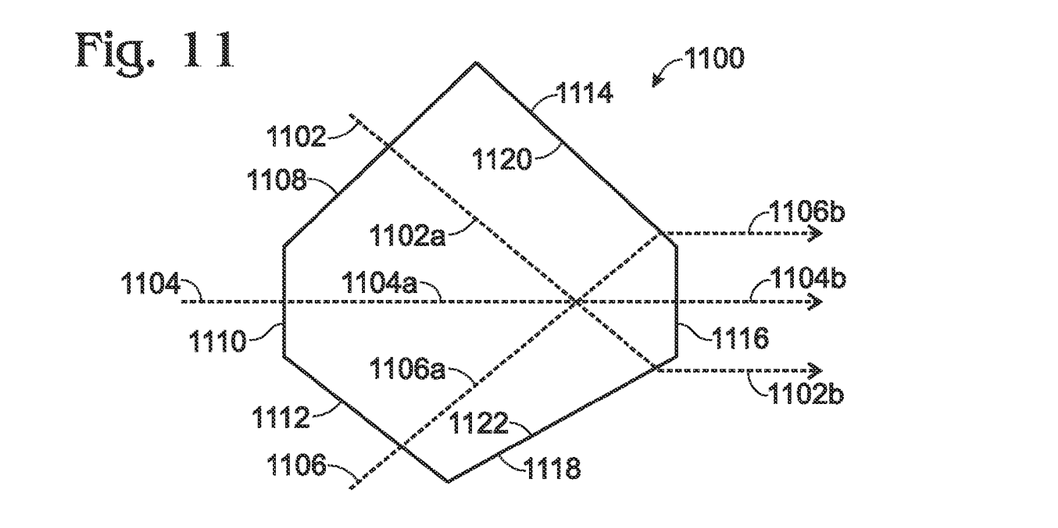

FIG. 11 shows a hexagonal laser combiner 1100. The configuration of this embodiment differs from the example in FIG. 10 in that it enables the input laser beams to enter the laser combiner with angles of separation that are not necessarily parallel, while still directing the output laser beam(s) in substantially the same direction. Laser combiner 1100 includes three external input faces. Face 1108 receives input laser beam 1102, face 1110 receives input laser beam 1104, and face 1112 receives input laser beam 1106. Laser combiner 1100 also includes three external output faces. Laser beam 1106 exits face 1114, laser beam 1104 exits face 1116, and laser beam 1102 exits face 1118. In the illustrated embodiment, the input laser beams originates and remain in the same plane until entering the laser combiner. Furthermore, the combined laser beam(s) remain in this same plane after leaving the laser combiner.

As shown at 1102a, laser beam 1102 enters the laser combiner straight through external input face 1108 and travels through the laser combiner to internal face 1122. As shown at 1102b, laser beam 1102 can be refracted as it exits output face 1118.

Laser combiner 1100 redirects laser beam 1106 in substantially the same way as it redirects laser beam 1102. As shown at 1106a, laser beam 1106 enters the laser combiner straight through external input face 1112 and travels through the laser combiner to internal face 1120. As shown at 1106b, laser beam 1106 can be refracted as it exits output face 1114.

Laser combiner 1100 has an optical geometry that allows laser beam 1104 to pass straight through the combiner. As shown, laser beam 1104 can be directed toward external input face 1110 and travels through the laser combiner at 1104a. As shown at 1104b, laser beam 1104 exits output face 1116 without changing direction.

In the above-described embodiment, the combined laser beam(s) exit the laser combiner parallel to each other and have exit paths with less separation distance than the entrance paths of the input laser beams entering the laser combiner. The separation distance of the combined laser beam(s) (i.e. laser beams 1102, 1104, and 1106) after exiting the laser combiner can only be as small as the length of output face 1116. In some embodiments, the laser beam(s) may exit the laser combiner with desired nonparallel exit paths.

Figure 12:
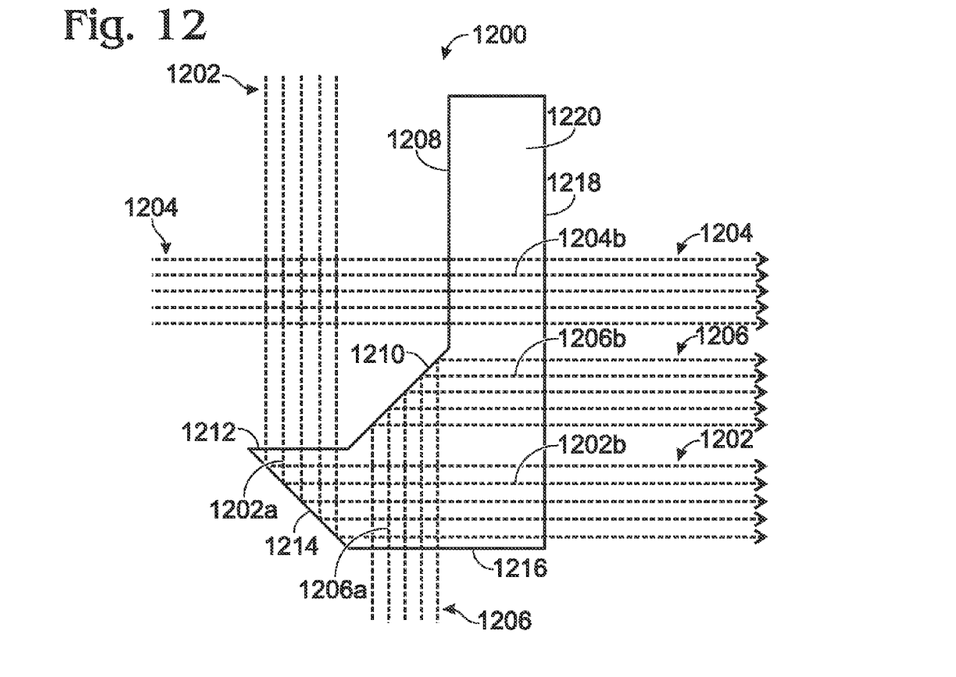

FIG. 12 shows an example of a laser combiner 1200 in the form of a molded piece that can be configured to combine two or more laser beams directed toward the laser combiner from two or more different directions. Laser combiner 1200 includes three external input faces. Face 1208 receives input laser beam 1204, face 1212 receives input laser beam 1202, and face 1216 receives input laser beam 1206. Laser combiner 1200 also includes an external output face 1218 from which the combined laser beam(s) (i.e. laser beam 1202, 1204, and 1206) exit the laser combiner. In the illustrated embodiment, the input laser beams originate and remain in the same plane until entering the laser combiner. Furthermore, the combined laser beam(s) remain in this same plane after leaving the laser combiner.

As shown at 1202a, laser beam 1202 can travel straight through external input face 1212 to internal face 1214 within the laser combiner. Laser beam 1202 can reflect off of internal face 1214, and as shown at 1202b, can travel between internal face 1214 and output face 1218. The laser beam may be totally internally reflected at internal face 1214.

As shown at 1206a, laser beam 1206 can travel straight through external input face 1216 to internal face 1210 within the laser combiner. Laser beam 1206 can reflect off of internal face 1210, and as shown at 1206b, can travel between internal face 1210 and output face 1218. In some embodiments, the laser beam may be totally internally reflected at internal face 1210.

Laser combiner 1200 has an optical geometry that allows laser beam 1204 to pass straight through the laser combiner without change in direction. As shown, laser beam 1204 can be directed toward external input face 1208 and travels through the laser combiner at 1204b to output face 1218, where the laser beam exits the laser combiner.

Laser beam 1202, laser beam 1204, and laser beam 1206 enter laser combiner 1200 from three different directions and exit laser combiner 1200 from a common output face with exit paths that are parallel and adjacent to each other. It should also be appreciated that the laser combiner in FIG. 12 has a tang 1220 which can be used for mounting.

Figure 13:
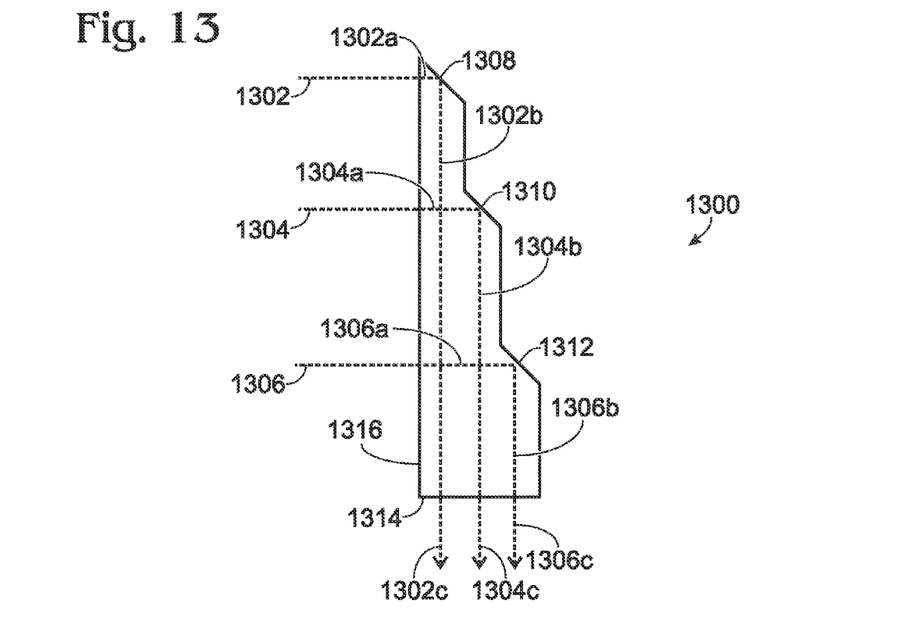

FIG. 13 shows a molded laser combiner 1300 that can be configured to combine at least three laser beams that can be directed toward the laser combiner from the same direction. Laser combiner 1300 includes an external input face 1316 that can receive laser beam 1302, laser beam 1304, and laser beam 1306. Laser combiner 1300 also includes an external output face 1314 from which the combined laser beam(s) (i.e. laser beams 1302, 1304, and 1306) exit the laser combiner. In the illustrated embodiment, the input laser beams originate and remain in the same plane until entering the laser combiner. Furthermore, the combined laser beam(s) remain in the same plane after leaving the laser combiner.

As shown at 1302a, input laser beam 1302 can travel straight through external input face 1316 to internal face 1308 within the laser combiner. Laser beam 1302 can reflect off of internal face 1308, and as shown at 1302b, can travel between internal face 1308 and output face 1314. Laser beam 1302 exits laser combiner 1300 at 1302c. In some embodiments, the laser beam may be totally internally reflected at internal face 1308.

As shown at 1304a, input laser beam 1304 can travel straight through external input face 1316 to internal face 1310 within the laser combiner. Laser beam 1304 can reflect off of internal face 1310, and as shown at 1304b, can travel between internal face 1310 and output face 1314. Laser beam 1304 exits laser combiner 1300 at 1304c. In some embodiments, the laser beam may be totally internally reflected at internal face 1310.

As shown at 1306a, input laser beam 1306 can travel straight through external input face 1316 to internal face 1312 within the laser combiner. Laser beam 1306 can reflect off of internal face 1312, and as shown at 1306b, can travel between internal face 1312 and output face 1314. Laser beam 1306 exits laser combiner 1300 at 1306c. In some embodiments, the laser beam may be totally internally reflected at internal face 1312.

The combined laser beam(s) (i.e. laser beam 1302, 1304, and 1306) exit the laser combiner with substantially parallel exit paths and a separation distance that is less than the input separation distance.

Some embodiments of molded laser combiners may be configured with a tang that can be used to mount the combiner. The tang may be an extension in the same plane of a molded laser combiner, although this is not required. The tang can be perpendicular to the plane of the laser combiner or at a non-perpendicular angle.

Figure 14A:
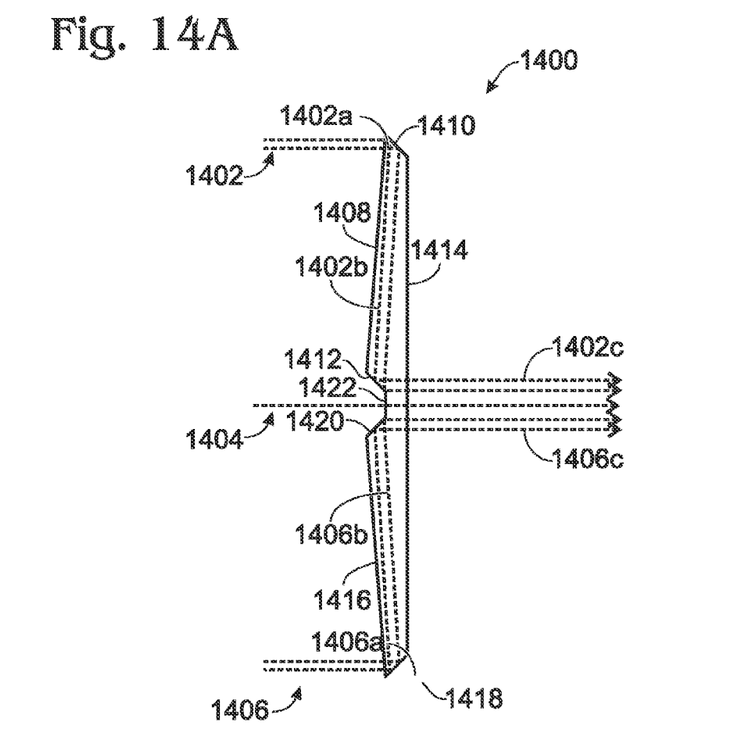
Figure 14B:
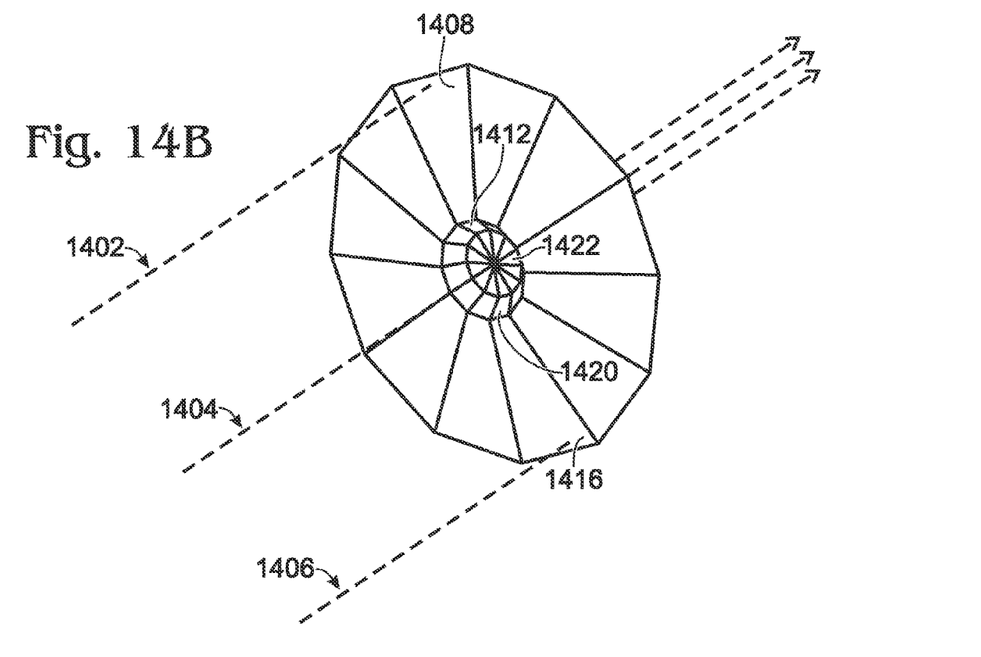

FIGS. 14A and 14B show a molded laser combiner 1400 that includes a recessed external input face 1422. Laser combiner 1400 can be configured to combine at least three laser beams that can be directed toward the laser combiner from the same direction. Laser combiner 1400 includes two external input faces. Face 1408 receives input laser beam 1402, and face 1416 receives input laser beam 1406. Laser beam 1404 travels through recessed face 1422 configured to allow laser beam 1404 to pass directly through laser combiner 1400. Laser combiner 1400 also includes an external output face 1414 from which laser beams 1402, 1404, and 1406 exit. In the illustrated embodiment, the input laser beams originate and remain in the same plane until entering the laser combiner. Furthermore, the combined laser beam(s) remain in the same plane after leaving the laser combiner.

Laser beam 1402 travels straight through input face 1408 and, at 1402a, can be reflected off of face 1410. As shown at 1402b, laser beam 1402 can travel from internal face 1410 to internal face 1412 within the laser combiner. Faces 1410 and 1412 can be configured to be planar and parallel to one another to maintain collimated laser beam 1402 as it travels through laser combiner 1400. As shown at 1402c, laser beam 1402 can reflect off of internal face 1412 and exit through output face 1414. In some embodiments, the laser beam may be totally internally reflected at face 1410 and face 1412.

Laser combiner 1400 redirects laser beam 1406 in substantially the same way as it redirects laser beam 1402. As shown, laser beam 1406 travels straight through input face 1416 and, at 1406a, can be reflected off of face 1418. As shown at 1406b, laser beam 1406 can travel from internal face 1418 to internal face 1420 within the laser combiner. Faces 1418 and 1420 can be configured to be planar and parallel to one another to maintain the collimated laser beam 1406 as it travels through laser combiner 1400. As shown at 1406c, laser beam 1406 can be reflected off of internal face 1420 and exit through output face 1414. In some embodiments, the laser beam may be totally internally reflected at face 1418 and face 1420.

The combined laser beam(s) (i.e. laser beam 1402, 1404, and 1406) exit through the laser combiner with substantially parallel exit paths and a separation distance that is less than the input separation distance. As shown in FIG. 14B, laser combiner 1400 can be partitioned into a plurality of sections, wherein each section can be configured to combine at least two laser beams. In some examples, the number of laser beams being combined can vary depending on the number of partitions in a particular configuration.

Figure 15A:
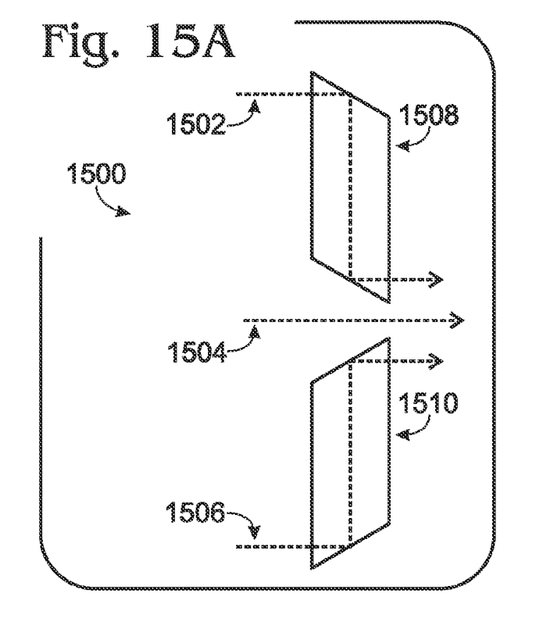
Figure 15B:
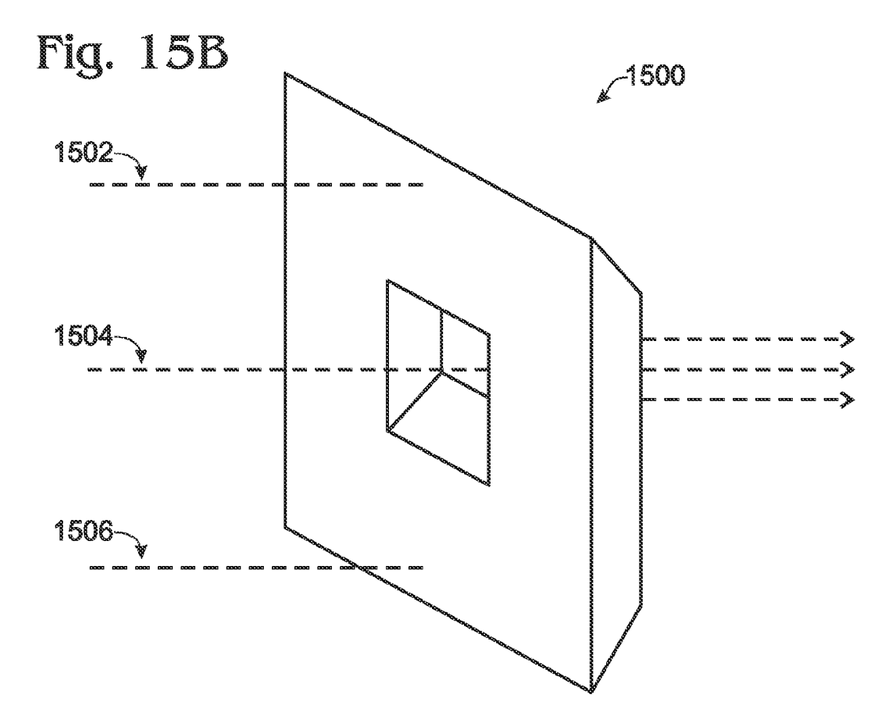

FIGS. 15A and 15B show another embodiment of a laser combiner with a vacant interior space configured to allow a laser beam to pass through without a change in direction. As shown, laser combiner 1500 can be configured with two portions (1508 and 1510) for receiving and combining laser beams 1502 and 1506 while a third laser beam 1504 can pass directly through the vacant interior space between portions 1508 and 1510 of laser combiner 1500. Laser combiner 1500 can be configured so that laser beam 1504 does not enter the laser combiner.

Figure 16:
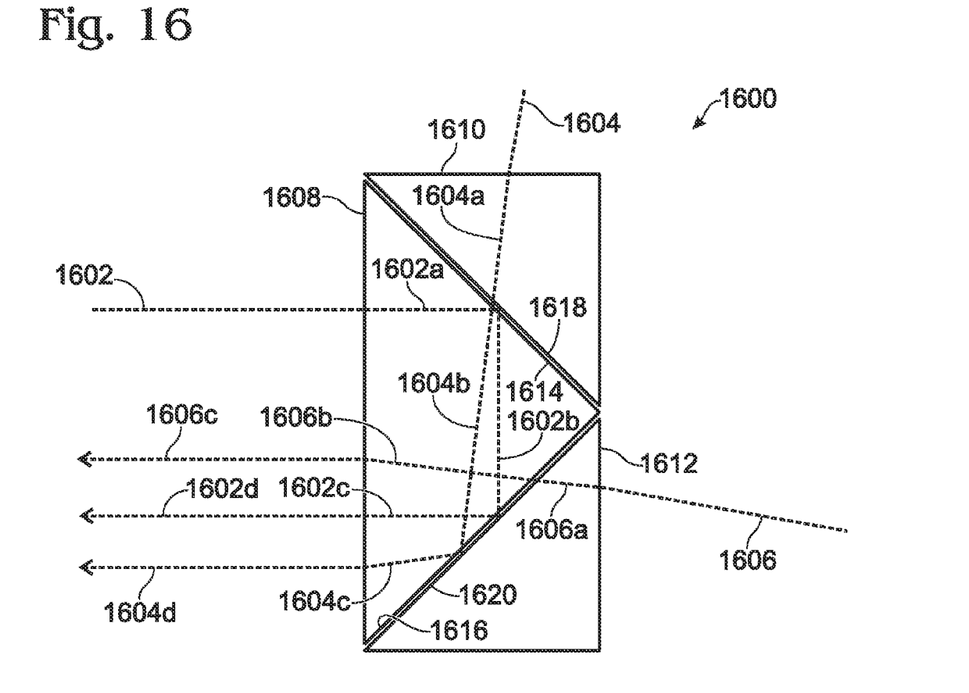

FIG. 16 schematically shows another example of a laser combiner configured to combine a plurality of laser beams entering the laser combiner from a variety of directions. In this embodiment, the laser combiner uses two discriminator prisms. A discriminator prism can reflect light from one direction which is very close to the critical angle, and transmit light through a small air space that is just beyond the critical angle. The air space can be approximately 0.010 mm in some embodiments, although smaller or larger air spaces can be used.

Laser combiner 1600 can be configured to combine three or more laser beams from three or more different directions. Laser combiner 1600 can be configured so that face 1608 can receive input laser beam 1602. Face 1608 can also be configured to output the combined laser beam(s) (i.e. laser beams 1602, 1604, and 1606). Laser beam 1602 can travel straight through input face 1608. As shown at 1602a, laser beam 1602 can travel from face 1608 and can be reflected off of face 1614. As shown at 1602b, laser beam 1602 can travel from internal face 1614 to internal face 1616 within the laser combiner. As shown at 1602c, laser beam 1602 can be reflected off of internal face 1616 and can travel to face 1608. As shown at 1602d, laser beam 1602 can exit laser combiner 1600 through face 1608. In some embodiments, the laser beam may be totally internally reflected at face 1614 and/or face 1616.

Laser combiner 1600 can be configured so that laser beam 1604 can enter through face 1610 where it can be refracted. As shown at 1604a, laser beam 1604 can travel from face 1610 to face 1618. Laser beam 1604 can travel across an air space and into face 1614 just beyond the critical angle of the reflective medium so that laser beam 1604 can transmit through face 1614. As shown at 1604b, laser beam 1604 can travel from internal face 1614 to internal face 1616 where it can be reflected. As shown at 1604c, laser beam 1604 can travel from face 1616 to face 1608. As shown at 1604d, laser beam 1604 can exit laser combiner 1600 through face 1608. In some embodiments, the laser beam may be totally internally reflected at face 1616.

Laser combiner 1600 can be configured so that laser beam 1606 can enter through face 1612 where it can be refracted. As shown at 1606a, laser beam 1606 can travel from face 1612 to face 1620. Laser beam 1606 can travel from face 1620 across an air space and into face 1616 where it can be refracted. As shown at 1606b, laser beam 1606 can travel 1616 to face 1608. As shown at 1606c, laser beam 1606 can exit laser combiner 1600 through face 1608.

The combined laser beam(s) (i.e. laser beams 1602, 1604, and 1606) exit the laser combiner with a separation distance that is less than an input separation distance. The combined laser beam(s) can occupy substantially the same physical space but with slightly different angles. In some embodiments, instead of being directed through substantially the same space, the combined laser beams may be substantially less separated than the input laser beams but still remain distinctly separated. In some embodiments, the laser beams may exit the laser combiner in substantially parallel paths, and in some embodiments, the laser beams may exit the laser combiner with desired nonparallel paths.

This system could be configured to combine four beams (one from above, one from below, two from the right) or more. The air spaces in the laser combiner prism may have relatively loose tolerances, but the two surfaces on either side of the air space should be configured so that they do not touch where a laser reflects. The air gaps could be created by spacer balls in adhesive (e.g., a film adhesive mask) or the faces could be polished not quite flat and held together mechanically.

Two or more laser combiners can be used in series and/or parallel. For example, a color laser system may include four red laser beams that are combined with a first laser combiner, four green laser beams that are combined with a second laser combiner, and four blue laser beams that are combined with a third laser combiner (i.e. a R, G, B color projector). As another example, four red laser beams can be combined by a first laser combiner to make a first combined beam, and four different red laser beams can be combined by a second laser combiner to make a second combined beam (in parallel to the first laser combiner). The first and second combined laser beams can then be combined by a third laser combiner (in series to the first and second laser combiners).

Although the embodiments described throughout this disclosure are generally described as having a smooth surface, it should be appreciated that in some embodiments, the faces of a laser combiner may include varying degrees of optical power, wherein optical power is the degree to which a surface converges or diverges light.

Figure 17:
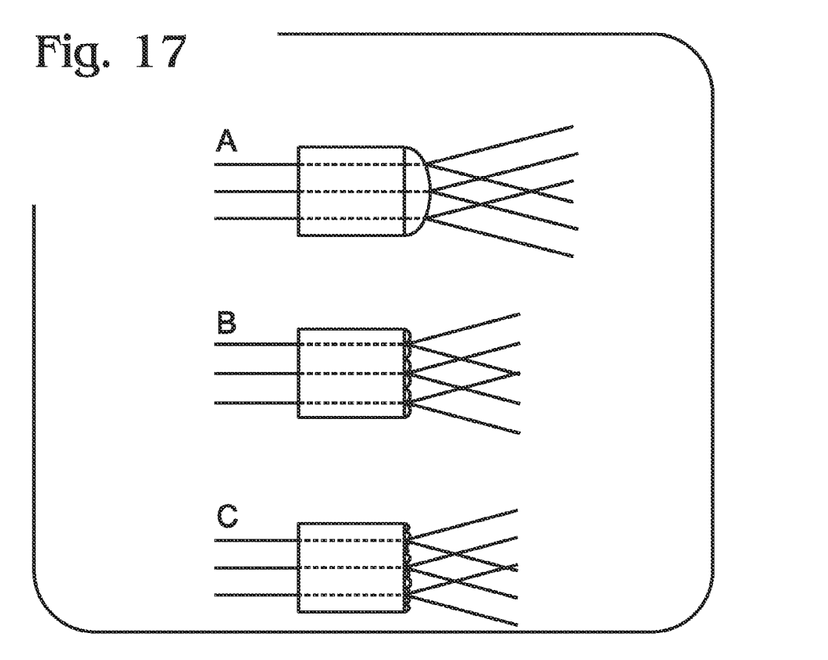
FIG. 17 shows various modifications that can be made to one or more aspects of a laser combiner to alter optical effects.

FIG. 17 schematically shows a portion of a laser combiner A, laser combiner B, and laser combiner C. Laser combiner A can be configured with a single smooth curved surface, laser combiner B can be configured with a micro lens array which is a plurality of substantially similar smooth curved surfaces, and laser combiner C can be configured with a diffusion surface which is a surface with volumetric diffuser material and surface structures that curve the light to diverge from its collimated state. These features can be used to produce various results depending on a particular application. Specifically, the textures can produce a uniform laser beam, make a laser beam despeckled, or can work in cooperation with other optics to produce a desired result.

Furthermore, while the laser combiners of this disclosure have been discussed primarily as being used in a laser system, it should be noted that the above described laser combiners may be suitable for use in a wide variety of optical applications requiring laser combination.

The invention claimed is:

1. A laser system, comprising:
a first laser device configured to emit a first laser beam;
a second laser device configured to emit a second laser beam;
a third laser device configured to emit a third laser beam; and
a laser combiner configured to receive the first, second, and third laser beams and output the first, second, and third laser beams with less separation downstream of the laser combiner than upstream of the laser combiner, and wherein the laser combiner is further configured to reflect at least one of the first laser beam and the second laser beam off a first internal face and to cause at least one of the first and the second laser beams to travel within the laser combiner and to reflect off a second internal face and to exit through an output face;
wherein the output face is configured to produce one or more of a despeckled beam, an optical power that converges light, and an optical power that diverges light; and
wherein the output face includes a micro lens array including a plurality of substantially similar smooth curved surfaces.

2. A laser system, comprising:
a first laser device configured to emit a first laser beam;
a second laser device configured to emit a second laser beam;

a third laser device configured to emit a third laser beam; and a laser combiner configured to receive the first, second, and third laser beams and output the first, second, and third laser beams with less separation downstream of the laser combiner than upstream of the laser combiner, and wherein the laser combiner is further configured to reflect at least one of the first laser beam and the second laser beam off a first internal face and to cause at least one of the first and the second laser beams to travel within the laser combiner and to reflect off a second internal face and to exit through an output face;

wherein the output face is configured to produce one or more of a despeckled beam, an optical power that converges light, and an optical power that diverges light; and wherein the output face includes a diffusion surface having a volumetric diffuser material and surface structures that curve light to diverge it from its collimated state.

3. The laser system of claim 1, wherein the laser combiner is configured to output the first, second, and third laser beams with substantially parallel exit paths.

4. The laser system of claim 1, wherein the laser combiner is configured to output the first, second, and third laser beams with substantially overlapping exit paths.

5. The laser system of claim 1, wherein the laser combiner is made from at least one of a substantially homogeneous plastic and a substantially homogeneous glass.

6. The laser system of claim 2, wherein the laser combiner is configured to output the first, second, and third laser beams with substantially parallel exit paths.

7. The laser system of claim 2, wherein the laser combiner is configured to output the first, second, and third laser beams with substantially overlapping exit paths.

8. The laser system of claim 2, wherein the laser combiner is made from at least one of a substantially homogeneous plastic and a substantially homogeneous glass.

* * * * *